United States Patent [19]

Heyd et al.

[11] Patent Number: 4,740,361
[45] Date of Patent: Apr. 26, 1988

[54] PROCESS FOR REMOVING METAL CARBONYLS FROM GASEOUS STREAMS

[75] Inventors: Robert L. Heyd, Morgantown, W. Va.; Thomas P. Pignet, Menomonee Falls, Wis.

[73] Assignee: Union Carbide Corporation, Danbury, Conn.

[21] Appl. No.: 845,291

[22] Filed: Mar. 27, 1986

[51] Int. Cl.$^4$ .............................................. B01D 53/34
[52] U.S. Cl. ........................................ 423/210; 55/72
[58] Field of Search .................. 423/210, 215.5, 230; 55/72

[56] References Cited

U.S. PATENT DOCUMENTS

| | | | |
|---|---|---|---|
| 1,631,823 | 6/1927 | Jannek | 423/210 |
| 2,239,000 | 4/1941 | Groombridge et al. | 502/329 |
| 2,881,094 | 4/1959 | Hoover | 117/107 |
| 2,886,468 | 5/1959 | Hoover et al. | 117/107 |
| 3,013,987 | 12/1961 | Castor et al. | 502/61 |
| 3,433,841 | 3/1969 | Dehn et al. | 260/643 |
| 3,441,370 | 4/1969 | Gutmann et al. | 423/244 |
| 3,492,083 | 1/1970 | Lowicki et al. | 423/244 |
| 3,595,965 | 7/1971 | Franz et al. | 201/25 |
| 3,598,528 | 8/1971 | Franz et al. | 423/461 |
| 3,624,165 | 11/1971 | Dehn et al. | 260/643 F |
| 3,743,674 | 7/1973 | Hohenschultz et al. | 260/540 |
| 3,780,163 | 12/1973 | Callighan et al. | 423/210 |
| 3,903,172 | 9/1975 | Monney et al. | 260/601 R |
| 4,009,009 | 2/1977 | Massoth et al. | 55/73 |
| 4,108,552 | 8/1978 | Austin et al. | 356/87 |
| 4,128,619 | 12/1978 | Robinson | 423/244 |
| 4,271,133 | 6/1981 | Tellis | 423/230 |
| 4,455,286 | 6/1984 | Young et al. | 423/230 |
| 4,521,387 | 6/1985 | Broecker et al. | 423/210 |

FOREIGN PATENT DOCUMENTS

| | | |
|---|---|---|
| 852414 | 3/1976 | Belgium . |
| 836838 | 6/1976 | Belgium . |
| 836839 | 6/1976 | Belgium . |
| 873505 | 1/1979 | Belgium . |
| 1041026 | 10/1978 | Canada . |
| 121869 | 2/1967 | Czechoslovakia . |
| 124215 | 9/1967 | Czechoslovakia . |
| 106409 | 6/1974 | Fed. Rep. of Germany . |
| 2292512 | 6/1976 | France . |
| 54-56089 | 5/1979 | Japan . |
| 12540 | 3/1976 | United Kingdom . |
| 1522389 | 8/1978 | United Kingdom . |
| 473509 | 6/1975 | U.S.S.R. . |
| 511099 | 5/1976 | U.S.S.R. . |

OTHER PUBLICATIONS

Chemistry, Bailas, Jr. et al, Academic Press, 1978, pp. 439-440.
"Catalyst Handbook", pp. 46-56, Springer-Verlag, New York, Inc. (1970).
Cooper et al., "Nickel and Iron Carbonyls in Town Gas," The Gas Council, London (1963).
Degent et al., "Contribution to the Study of the Formation, Elimination and Analysis of Traces of Iron Carbonyl and Nickel Carbonyl in the Gas of the Beynes Underground Resevoir", Compute Rends Assoc. Tech. de l'Ind. du Gaz en France (1961).
Dumay et al., "How the Problem to Eliminate Nickel Carbonyl from the Gas Taken Back From the Underground Storage at Beynes was Solved", Assoc. Tech l'Ind. du Gaz en France (1965).
Homfeld, "Operating Measures for the Removal of Carbonyls from the Gas of the Reitbrook Underground Tank of the Hamburg Gaswerke Ag", *Gas v. Wasserfach* (1968).
Massoth, "Characterization of Molybdena Catalysts", *Advances in Catalysis* (1978).
Tewes et al., "Catalytic Gas Plating with Nickel Carbonyl", AEC R/D Report No. K-1533 (1962).

*Primary Examiner*—John Doll
*Assistant Examiner*—Jeffrey Edwin Russel
*Attorney, Agent, or Firm*—Reynold J. Finnegan

[57] ABSTRACT

Process for removing metal carbonyl contaminants from a gaseous stream which comprises contacting the gaseous stream with a zinc sulfide absorbent to thereby remove metal carbonyl contaminants from the gaseous stream, and separating the gaseous stream from the zinc sulfide absorbent.

12 Claims, No Drawings

PROCESS FOR REMOVING METAL CARBONYLS FROM GASEOUS STREAMS

BACKGROUND OF THE INVENTION

1. Field of the Invention

This invention relates to processes for removing metal carbonyls from gaseous streams and, in particular, from synthesis gas streams.

2. Description of the Prior Art

Synthesis gas, a gas mixture containing primarily hydrogen and carbon monoxide, has become an increasingly important feedstock for the chemical industry. The gas can be produced by the partial oxidation or steam-reforming of hydrocarbons including natural gas, distillate oils and residual oil, and by gasification of coal and coke. Synthesis gas is converted to many valuable chemicals by such catalytic processes as the Fisher-Tropsch synthesis, which produces a variety of selected alcohols, hydrocarbons, ketones and aldehydes, and the Oxo hydroformylation process in which synthesis gas is reacted with olefins to yield numerous specific alcohols, ketones and aldehydes. The conversion of synthesis gas by these catalytic processes, however, may be adversely affected by various impurities which are almost invariably present in synthesis gas.

The type and relative concentrations of impurities in synthesis gas depend on the feedstock from which the gas is derived and the conditions under which it is produced. Typically, as a result of its manufacture, synthesis gas contains impurities including sulfur compounds, such as hydrogen sulfide ($H_2S$), carbonyl sulfide (COS), carbon disulfide ($CS_2$) and methyl mercaptan ($CH_3SH$), as well as hydrogen cyanide (HCN), hydrogen chloride (HCl) and other compounds.

Present purification schemes to remove high concentrations of such impurities generally utilize a reactive liquid absorbent, such as aqueous solutions of ethanolamines or alkali carbonates and hydroxides, as a primary purification agent. Also employed as a primary purification agent are non-reactive physical absorbents, such as methanol at cryogenic temperatures. Purifying synthesis gas to a high degree with such absorbents, however, is uneconomical due to the disproportionately large amounts of energy required to regenerate the spent absorbent.

Accordingly, after treatment by a primary purification scheme, synthesis gas generally is subjected to a further purification process to reduce the sulfur impurities to an acceptable level. For many synthesis gas uses, sulfur concentrations below 1 part per million by volume (ppmv) are required. Though absorbents such as activated charcoal and molecular sieves are useful for removing sulfur compounds, the principal absorbent employed in commercial processes to remove sulfur impurities is zinc oxide.

Employment of zinc oxide absorbents to remove sulfur impurities from gaseous streams is extensively described in the prior art. For example, U.S. Pat. Nos. 3,441,370 and 4,128,619 describe the removal of $H_2S$ with the use of a zinc oxide absorbent. U.S. Pat. No. 4,009,009 describes the use of zinc oxide to remove COS from arsenic-free gas streams and U.S. Pat. No. 3,492,083 broadly describes the removal of $H_2S$ and $SO_2$ from an industrial gas by using as an absorbent a mixture comprising oxides of aluminum, zinc, iron or manganese in combination with oxides of alkaline earth or alkali metals. U.S. Pat. No. 2,239,000 discloses the removal of sulfur from gas mixtures comprised of hydrogen and carbon monoxide using catalytic mixtures of zinc and iron oxides or zinc and chromium oxides. Also, U.S. Pat. No. 4,271,133 discloses the removal of $H_2S$, COS, $SO_2$ $CS_2$, $CH_3SH$, HCN and HCl from gases using zinc oxide as an absorbent.

The absorption of sulfur compounds by zinc oxide has been reported to involve the conversion of zinc oxide to zinc sulfide. See "Catalyst Handbook", pages 46–56, Springer-Verlag New York, Inc. (1970). Conventionally, as zinc oxide is converted to zinc sulfide, the absorption function of zinc oxide is understood to become exhausted.

However, there has been no appreciation, heretofore, regarding the possible capacity of zinc sulfide as an effective gas stream absorbent. Therefore, the converted, or "spent" zinc sulfide-zinc oxide has simply been discarded and replaced with fresh zinc oxide absorbent. Thus, while zinc oxide is well known in the prior art as an absorbent for the removal of sulfur compounds and hydrogen cyanide, there has been no appreciation regarding its possible capacity to act as an effective absorbent either directly or as an intermediate in the removal of such nonsulfur impurities as metal carbonyls, that also may be present in synthesis gas or other gas streams.

Metal carbonyl contamination of gas streams is principally a result of exposure of the gas to various types of metallic containers, reactors and piping. It is well known that the presence of metal carbonyls, particularly iron pentacarbonyl, $Fe(CO)_5$, and nickel tetracarbonyl, $Ni(CO)_4$, and mixtures thereof, at even very minor concentrations can seriously affect the activity and selectivity of the catalytic processing of synthesis gas.

In addition, fuel gases, such as natural gas and "Town gas" (a gaseous mixture containing hydrogen, carbon monoxide and methane) from underground storage reservoirs, are often contaminated with metal carbonyls. During combustion of fuel gases, the presence of metal carbonyls can lead to the deposition of metals and metal compounds on burners thereby inhibiting efficient oxidation.

Furthermore, metal carbonyls are known to be highly toxic. For example, the maximum exposure limit to nickel carbonyl is only one part per billion. Thus, the need to remove metal carbonyls from gaseous streams is extremely important.

Many procedures have been proposed in the prior art for removing metal carbonyls from synthesis gas and other gases. For example, Canadian Patent No. 1,041,026 discloses metal carbonyl absorption on activated alumina. In the described process, however, the feed gas must be cooled, preferably to the range of 5° to 15° C. U.S. Pat. No. 3,433,841 discloses the use of cation exchange resins to remove iron carbonyl impurities by way of an oxidation reduction reaction. U.S. Pat. No. 1,631,823 discloses the use of activated carbon and silica gel as absorbents for iron carbonyls.

Activated carbon has also been used in processing natural gases and "Town gas" from underground reservoirs to remove by absorption the metal carbonyls contained therein. See Degent et al., "Contribution to the Study of the Formation, Elimination and Analysis of Traces of Iron Carbonyl and Nickel Carbonyl in the Gas of the Beynes Underground Reservoir," Compute Rendu Assoc. Tech. de l'Ind. du Gaz en France (1961).

However, this reference teaches that activated carbon is inefficient in removing nickel carbonyls.

Mixing the metal carbonyl-containing gas with a small amount of air, or other oxidizing gas increases the efficiency of nickel carbonyl removal by forming metal oxides. See Dumay et al., "How the Problem of Eliminating Nickel Carbonyl From the Gas Taken Back From the Underground Storage At Beynes Was Solved," Assoc. Tech. de l'Ind. du Gaz en France (1965). However, when metal oxides are absorbed on activated carbon, they must be removed to regenerate the activated carbon. Their removal has proven so difficult that the exhausted activated carbon is generally discarded and replaced. In industrial operations, the relatively high cost of activated carbon and problems associated with spent carbon disposal make such metal carbonyl removal methods unattractive.

In U.S.S.R. Patent No. 473,509, chemisorbent sulfhydryl filaments are proposed for absorbing nickel carbonyl. The hydrogen or mercury ion forms of sulfhydryl are required in the described process. Indeed, it has been long known that the use of sulfur compounds by themselves was not suitably efficient in removing metal carbonyls. See Degent et al., "Contribution to the Study of the Formation, Elimination and Analysis of Traces of Iron Carbonyl and Nickel Carbonyl in the Gas of the Beynes Underground Reservoir," Compute Rendu Assoc. Tech. de l'Ind. du Gaz en France (1961). Though removal of nickel carbonyl by passing "Town gas" through a sulfur-containing liquid was said to be achieved, such removal has not been found reproducible. Cooper et. al., "Nickel and Iron Carbonyls In Town Gas" The Gas Council, London (1963).

It has now been found that zinc sulfide is an effective absorbent for reducing the metal carbonyl content of gaseous streams.

Therefore it is an object of the present invention to provide a novel process of employing zinc sulfide as an absorbent for removing metal carbonyl impurities from gaseous streams.

Another object of this invention is to provide a process for removing metal carbonyl impurities from gases using zinc sulfide-zinc oxide as the absorbent.

Still another object of this invention is to provide a process for removing metal carbonyl impurities from gaseous streams that is efficient over a wide range of operating conditions.

Other objects and advantages of the present invention will become apparent from the following description of the invention.

SUMMARY OF THE INVENTION

The present invention is a process for removing metal carbonyl contaminants from a gaseous stream containing such contaminants, which process comprises contacting the gaseous stream with a zinc sulfide absorbent to thereby remove metal carbonyl contaminants from the gaseous stream, and separating said gaseous stream from said zinc sulfide absorbent.

The present invention is predicated on the discovery that zinc sulfide is an effective absorbent for the removal of metal carbonyls from gaseous streams. More particularly, it has been found that zinc sulfide can be used to remove metal carbonyl impurities from gaseous streams over a wide range of commercially-practical process conditions.

DETAILED DESCRIPTION OF THE INVENTION

Metal carbonyl impurities are removed from a gaseous stream by the process of this invention by simply contacting the gaseous stream with a zinc sulfide absorbent for a period of time sufficient to reduce the metal carbonyl content in the gaseous stream to its desired level and then separating the gaseous stream from said absorbent. Zinc sulfide has been found to efficiently remove metal carbonyl impurities from gaseous streams and to effectively retain such impurities. The process is operable over a wide range of temperature and pressure conditions and is capable of reducing the metal carbonyl concentration in gaseous streams having even very low contaminant concentrations of such metal carbonyls.

Zinc sulfide absorbents suitable for the removal of metal carbonyls according to the process of the present invention include, of course, zinc sulfide per se and in any form, such as any of its particulate commercial grades. For example, high purity grades of zinc sulfide such as "Phosphor Grade" marketed by Johnson Matthey, Inc. are commercially available.

Another especially suitable zinc sulfide absorbent is "zinc sulfide-zinc oxide", i.e. a zinc sulfide-zinc oxide absorbent that has been produced by the absorption of a sulfur compound such as carbonyl sulfide, methyl mercaptan, ethyl mercaptan, carbon disulfide, hydrogen sulfide, and the like, from gaseous streams using a zinc oxide absorbent. As noted in "Catalyst Handbook", pages 46-56, Springer-Verlag New York, Inc. (1970), it is reported that portions of a zinc oxide absorbent are converted to zinc sulfide as a result of its absorption of sulfur, and such sulfur-containing absorbents are defined herein as zinc sulfide-zinc oxide absorbents.

Moreover, it is known that as sulfur is removed from a gas stream using a zinc oxide absorbent, the effectiveness of the zinc oxide absorbent to remove sulfur decreases proportionately with the amount of sulfur absorbed. Indeed, heretofore in conventional industrial processes, it has been the practice to discard the used zinc oxide absorbent when the absorbent can no longer efficiently absorb further sulfur impurities and replace the exhausted or spent "zinc sulfide-zinc oxide" produced absorbent with fresh zinc oxide absorbent.

Thus another especially significant feature of this invention is the discovery that zinc sulfide-zinc oxide absorbents produced as described above, which have become fully, substantially, or even only partially exhausted in their capacity to absorb sulfur, can be effective absorbents for removing metal carbonyl impurities from gaseous streams. Surprisingly, ineffective or "spent" zinc oxide absorbents which have heretofore been assumed to have little or no further utility have now been found to have an important commercial utility by virtue of the present invention.

Accordingly it is to be understood that the term "zinc sulfide absorbent", as employed herein, also encompasses such zinc sulfide-zinc oxide absorbents produced as described above.

It is to be further understood that since it is the zinc sulfide that is considered to effect the removal of the metal carbonyl impurities from the gaseous streams, the sulfur content of such zinc sulfide-zinc oxide absorbents employable in this invention is not narrowly critical. For instance, the sulfur content of such zinc sulfide-zinc oxide absorbents may obviously range from that minimum amount necessary to at least effect some reduction in the metal carbonyl content of the gaseous stream to be treated up to the maximum sulfur content present in a "spent" zinc sulfide-zinc oxide absorbent, i.e. one whose capacity to absorb further sulfur impurities has become fully exhausted.

The point at which such a zinc sulfide-zinc oxide absorbent becomes "spent" or fully exhausted in regard to its ability to further absorb sulfur impurities, and thus is usually discarded, can vary widely according to such factors as the types and concentrations of the sulfur compounds in the gas stream undergoing such treatment, the gaseous space velocity, gas pressure and reaction temperatures employed, as well as other commercial considerations. However, such a zinc sulfide-zinc oxide absorbent employable herein may be considered "spent" or fully exhausted, when the amount of sulfur impurities in the outlet gas (i.e. the gas leaving the absorbent bed) of a sulfur absorption process using zinc oxide is essentially equal to the amount of sulfur impurities in the inlet gas (i.e. the gas being fed to the absorbent bed).

Thus it is considered that zinc sulfide-zinc oxide absorbents so produced having a sulfur content of from about 2.5 (and preferably about 5) to about 30 weight percent or higher (calculated weight of sulfur absorbed/weight of zinc oxide absorbent charged) may be employed in this invention and that such absorbents should be sufficient in most instances for effectively removing metal carbonyl impurities from gaseous streams containing same. Further, it has been noted that as the sulfur concentration of such zinc sulfide-zinc oxides produced by a sulfur absorption process using a zinc oxide absorbent, as explained herein, is increased, the metal carbonyl removal efficiency of the so-produced zinc sulfide-zinc oxide absorbent is increased. Accordingly, the more preferred zinc sulfide-zinc oxide absorbent employable in this invention is a "spent" zinc sulfide-zinc oxide absorbent, as previously defined and explained herein above.

Moreover, it has been found that in connection with the present invention such zinc sulfide-zinc oxide absorbents which have not as yet become "spent" or fully exhausted in regard to their capacity to absorb further sulfur impurities can be employed to efficiently remove both sulfur and metal carbonyl impurities from the same gaseous stream containing same. Thus in addition to providing an important commercial utility for spent zinc sulfide-zinc oxide absorbents which heretofore have been assumed to have little or no further utility and generally have been discarded by the prior art, the subject invention also provides a unique, heretofore unknown, method for the simultaneous removal of both sulfur impurities and metal carbonyl impurities from the same gaseous stream. However, because sulfur compounds are retained by zinc oxide, high sulfur concentrations in the gas to be treated may shorten the useful life of the absorbent bed for sulfur compound removal. Accordingly, to maximize the advantage of the discovery of the simultaneous co-removal of metal carbonyl and sulfur contaminants in the presence of an absorbent mixture of zinc oxide and zinc sulfide, be it in the form of a mixture of zinc sulfide or zinc sulfide-zinc oxide and zinc oxide or in the form of only a zinc sulfide-zinc oxide absorbent so produced as explained herein, it is preferred that the gas to be treated contain less than about 5 volume percent sulfur.

The sulfur compounds contained in the gaseous stream that are simultaneously removed with the metal carbonyl impurities are any of those sulfur compounds that are removable by zinc oxide. Such sulfur compounds include hydrogen sulfide, carbonyl sulfide, carbon disulfide, methyl mercaptan, and ethyl mercaptan among others. Hydrogen chloride and hydrogen cyanide impurities can also be co-removed in producing a zinc sulfide-zinc oxide absorpent useful in the present invention.

Zinc oxide is a well known, commercially available material. Zinc oxide in any of its commercial grades can be employed as the starting absorbent for producing zinc sulfide-zinc oxide absorbent. For example, suitable zinc oxides are marketed by United Catalysts, Inc. bearing the identification C7-2-1 and G72 and by Imperial Chemicals bearing the identification 32-4. These commercial grades generally include other metal oxides such as silica, alumina, and calcium oxide along with zinc oxide to impart to the commercial material desired physical properties, such as high crush strength.

Zinc oxide absorbents prepared by the methods known in the art such as disclosed in U.S. Pat. No. 4,128,619 also would be suitable for conversion to zinc sulfide-zinc oxide absorbent, as would catalyst pellets formed by the methods disclosed in Belgian Patent No. 873,505. The most preferred zinc oxide absorbent has high surface area, in excess of about 20 meters$^2$/gram, and bulk density in the range from about 60 to 80 lb/ft$^3$.

Of course the zinc sulfide absorbent employable in this invention may also be employed with other conventional metal and metal oxide absorbents to effect co-removal of other impurities in the process of this invention. In particular, mixtures of zinc sulfide and a metal oxide such as copper oxide, chromium oxide, iron oxide, alumina, and the like, or mixtures thereof, among others, can be utilized. Such metal oxides can be added to either zinc sulfide or zinc sulfide-zinc oxide absorbent.

The manner by which the gaseous stream is contacted with the zinc sulfide absorbent is not critical to the process of this invention. Conventional known absorbent methods and equipment may be employed. The process can be conducted in a fixed bed, expanded bed, or fluidized bed operation.

Purification of a broad spectrum of gaseous mixtures containing metal carbonyls may be achieved according to the process of the present invention. The process of this invention is suited to the removal of metal carbonyl contaminants from any gaseous stream containing such contaminants and in particular to the removal of metal carbonyls from synthesis gas, natural gas, "Town gas", coke oven gas or other gases containing carbon monoxide and hydrogen, as well as essentially pure carbon monoxide gas streams, air streams, and mixtures of carbon monoxide with other gases. The gas may contain metal carbonyls in any concentration. The gas to be treated may also contain sulfur impurities, especially when the simultaneous removal of such sulfur is desired. However, the subject invention is more preferably directed to removing metal carbonyl impurities from "sulfur-free" gaseous streams, i.e. a gaseous stream free from all sulfur impurities.

Metal carbonyls that are considered removable by the process of this invention include for example any stable carbonyl of nickel, iron, cobalt, vanadium, chromium, molybdenum, tungsten, manganese, rhenium, ruthenium, osmium, and rubidium. Where the gas contains a mixture of metal carbonyls, the process of the invention is considered to remove the carbonyls simultaneously. The process of this invention is especially suitable for removing iron pentacarbonyl and/or nickel tetracarbonyl impurities from all types of gases containing same.

The process of the present invention may be carried out over a broad range of temperatures. The lower temperature limit, of course, is determined by the kinetics of the reaction between the zinc sulfide absorbent and the metal carbonyl impurities. Higher temperatures, in general, enhance the removal of metal carbonyls. The upper temperature limit is usually the temperature at which zinc sulfide decomposes. In general, the process can be conducted at temperatures from about 0° to 650° C. The preferred temperature range is from about 90° to 350° C.

The pressure at which the process is carried out may vary over a wide range, typically from ambient pressure to five hundred atmospheres or more. However, the partial pressure of carbon monoxide in the gas to be treated can be a significant factor to be considered in metal carbonyl removal. Generally, the higher the carbon monoxide partial pressure, the more difficult metal carbonyl removal becomes, because carbon monoxide acts to stabilize the metal carbonyls. The preferred range of carbon monoxide partial pressure is from about 1 atmosphere up to about 300 atmospheres; more preferably about 100 atmospheres or less. However, the process can achieve measurable metal carbonyl removal at higher carbon monoxide partial pressures.

The space velocity of the gas stream to be treated with the zinc sulfide absorbent is a matter of choice which depends, in part, on the concentration of metal carbonyls present in the gas, the efficiency of removal desired, and the operating temperatures and pressures (particularly carbon monoxide partial pressure) of the gas. In general, the lower the space velocity, the greater is the process effeciency. The process of this invention achieves metal carbonyl removal at space velocities (volumetric gas flow rate/absorbent bed volume) even in excess of 10,000 $hr^{-1}$. Preferred space velocities are from about 200 to about 5000 $hr^{-1}$; especially from about 1000 to about 4000 $hr^{-1}$.

Then, 200 grams (175 cc) of United Catalysts Inc. type C7-2-01 zinc oxide,[1] in the form of 3/16 inch pellets, was added to the vessel forming a three-inch tall bed. The remainder of the vessel was filled with ¼ inch glass balls.

| [1]ZnO | = | 80 weight % (±5%) |
|---|---|---|
| $SiO_2$ | = | 5–10 weight % |
| $Al_2O_3$ | = | 4–6 weight % |
| pore volume | = | 0.20 to 0.28 cc/g. |
| surface area | = | 22 $m^2$/g. |
| bulk density | = | 70 ± 5 lbs/cu. ft. |

Thereafter, sulfur-containing synthesis gas (49.75 volume % hydrogen, 49.75 volume % carbon monoxide, 0.5 volume % hydrogen sulfide) was fed from the top of the resulting zinc oxide-containing vessel which was maintained at 180° C. and at 900 psig. The treated synthesis gas was exhausted from the bottom of the vessel. The synthesis gas feed was continued until the zinc oxide absorbent bed was no longer effective for sulfur removal, i.e. 0.51 volume percent $H_2S$ in the feed gas and 0.49 volume percent $H_2S$ in the exit gas. The vessel was then purged with sulfur-free synthesis gas. The resulting zinc sulfide-zinc oxide absorbent bed was calculated to contain about 25 weight percent sulfur.

A bed of nickel metal pellets wrapped in heating tape was then connected upstream of the zinc sulfide-zinc oxide absorbent bed vessel to generate a significant nickel carbonyl concentration in the synthesis gas. A bypass line around the nickel bed ("nickel carbonyl generator") also was provided.

Sulfur-free synthesis gas (50 volume percent hydrogen, 50 volume percent carbon monoxide) contaminated with nickel tetracarbonyl ($Ni(CO)_4$), and iron pentacarbonyl ($Fe(CO)_5$) then was fed at a rate of 200 standard liters per hour (resulting in a space velocity of 1142 $hr^{-1}$) through the zinc sulfide-zinc oxide absorbent bed while bypassing the nickel-carbonyl generator. The zinc sulfide-zinc oxide bed total pressure was maintained at 900 psig, resulting in a carbon monoxide partial pressure in the synthesis gas of 450 psig (30.6 atmospheres). The process parameters and metal carbonyl removal rate are set forth in Table I.

TABLE I

| Nickel Carbonyl Generator | ZnS—ZnO Bed Temp. °C. | Synthesis Gas Feed | | Resultant Purified Synthesis Gas Product | | | | % $Ni(CO)_4$ Removal | % $Fe(CO)_5$ Removal |
|---|---|---|---|---|---|---|---|---|---|
| | | $Ni(CO)_4$ PPBV | $Fe(CO)_5$ PPBV | $Ni(CO)_4$ PPBV | $Fe(CO)_5$ PPBV | $H_2S$ PPMV | COS PPMV | | |
| Bypassed | 180 | 123 | 3445 | 34 | 15 | ND | 8 | 72 | 99.6 |

PPBV—Parts per billion by volume
PPMV—Parts per million by volume
ND—None detected, concentration below analyzer detection limit.
% metal carbonyl removal = [(inlet gas concentration - outlet gas concentration)/inlet gas concentration][100%]

The following examples serve to illustrate certain embodiments of the present invention. The examples are not to be construed as limiting the scope of the invention. It will be readily apparent to one skilled in the art that various modifications can be made to the processes set forth in the examples in accordance with the principles of the present invention.

EXAMPLE 1

A bed of zinc sulfide absorbent was prepared in a sealed 22 inch section of 2-inch diameter schedule 40 pipe fitted with electrical resistance heaters and insulated to minimize heat loss. The bottom nine inches of this vessel was loaded with 500 cc of ¼ inch glass balls.

Metal carbonyl concentrations were measured using an analyzer designed to detect ultra-trace concentrations of metal carbonyls. The analyzer is described in U.S. Pat. No. 4,108,552.

EXAMPLES 2-12

The process concluded in Example 1 was repeated in runs 2-12 except that for each run the temperature of the zinc sulfide-zinc oxide bed, or the metal carbonyl content of the synthesis gas feed or both was varied and the synthesis gas either passed through or bypassed the nickel carbonyl generator. The absorbent bed was not replaced or supplemented between each successive run. The results of the runs are set forth in Table II. Metal carbonyl concentrations were measured using the same analyzer as in Example 1.

TABLE II

| Example No. | Nickel Carbonyl Generator | ZnS—ZnO Bed Temp. °C. | Synthesis Gas Feed | | Resultant Purified Synthesis Gas Product | | | | % Ni(CO)$_4$ Removal | % Fe(CO)$_5$ Removal |
|---|---|---|---|---|---|---|---|---|---|---|
| | | | Ni(CO)$_4$ PPBV | Fe(CO)$_5$ PPBV | Ni(CO)$_4$ PPBV | Fe(CO)$_5$ PPBV | H$_2$S PPMV | COS PPMV | | |
| 2 | Bypassed | 180 | 119 | 3480 | 36 | 7 | ND | 8 | 70 | 99.8 |
| 3 | On, 11° C. | 180 | 273 | 3744 | 28 | 9 | 0.1 | 6 | 90 | 99.8 |
| 4 | On, 14° C. | 180 | 1013 | 3410 | 85 | 24 | ND | 4 | 91 | 99.3 |
| 5 | On, 21° C. | 180 | 4149 | 3200 | 420 | 10 | ND | 3 | 90 | 99.7 |
| 6 | Bypassed | 180 | 1060 | 244 | 235 | 5 | ND | 3 | 78 | 97.9 |
| 7 | Bypassed | 180 | 589 | 204 | 150 | 5 | ND | 3 | 74 | 97.5 |
| 8 | Bypassed | 180 | 472 | 191 | 104 | 3 | ND | 3 | 78 | 98.4 |
| 9 | Bypassed | 180 | 400 | 191 | 80 | 7 | ND | 3 | 80 | 96.3 |
| 10 | Bypassed | 130 | 282 | 254 | 179 | 3 | ND | 2 | 36 | 98.8 |
| 11 | Bypassed | 130 | 118 | 730 | 66 | 3 | ND | 1 | 44 | 99.4 |
| 12 | Bypassed | 90 | 108 | 940 | 66 | 4 | ND | 1 | 39 | 99.6 |

PPBV—Parts per billion by volume
PPMV—Parts per million by volume
ND—None detected, concentration below analyzer detection limit.
% metal carbonyl removal = [(inlet gas concentration - outlet gas concentration)/inlet gas concentration][100%]

TABLE III

| Example No. | Nickel Carbonyl Generator | ZnS—ZnO Bed Temp. °C. | Synthesis Gas Feed | | | | | |
|---|---|---|---|---|---|---|---|---|
| | | | H$_2$ % | CO % | Ni(CO)$_4$ PPBV | Fe(CO)$_5$ PPBV | H$_2$S % | COS PPMV |
| 13 | Bypassed | 90 | 60 | 39.3 | 57 | 644 | 0.22 | ND |
| 14 | Bypassed | 90 | NM | NM | 66 | 592 | 0.23 | ND |
| 15 | Bypassed | 180 | NM | NM | 59 | 626 | 0.23 | ND |
| 16 | On | 180 | NM | NM | 3465 | 23 | 0.24 | ND |
| 17 | On | 240 | NM | NM | 2616 | 95 | 0.23 | ND |
| 18 | ON | 240 | NM | NM | 2263 | 260 | 0.23 | ND |

| Example No. | Resultant Purified Synthesis Gas Product | | | | % Ni(CO)$_4$ Removal | % Fe(CO)$_5$ Removal |
|---|---|---|---|---|---|---|
| | Ni(CO)$_4$ PPBV | Fe(CO)$_5$ PPBV | H$_2$S PPMV | COS PPMV | | |
| 13 | 424 | 3 | 0.19 | 108 | — | 99 |
| 14 | 113 | 3 | 0.21 | 100 | — | 99 |
| 15 | 140 | 38 | 0.20 | 130 | — | 94 |
| 16 | 1508 | ND | 0.18 | 150 | 56 | ≧90 |
| 17 | 1390 | 3 | 0.20 | 173 | 47 | ≧90 |
| 18 | 1108 | 15 | 0.21 | 173 | 51 | 94 |

PPBV—Parts per billion by volume
PPMV—Parts per million by volume
ND—None detected, concentration below analyzer detection limit.
NM—Not measured.
% metal carbonyl removal = [(inlet gas concentration - outlet gas concentration)/inlet gas concentration][100%]

EXAMPLES 13–18

A nickel tetracarbonyl (Ni(CO)$_4$), iron pentacarbonyl (Fe(CO)$_5$) and sulfur contaminated synthesis gas (0.22 to 0.24 volume percent hydrogen sulfide) was treated in the apparatus employed in Examples 1–12. The operating conditions were the same as in Example 1 except as noted hereafter.

The zinc sulfide-zinc oxide absorbent bed employed in Examples 1–12 was used without any further supplementation or replacement of absorbent. The sulfur-containing synthesis gas was fed at a rate of 200 liters per hour resulting in a space velocity of 1142 hr$^{-1}$ through the zinc sulfide-zinc oxide bed. The bed pressure was maintained at 900 psig for each of the runs, resulting in carbon monoxide partial pressure in the synthesis gas of about 360 psig (24.5 atmospheres). For each run, the absorbent bed temperature, or metal carbonyl concentration in the synthesis gas was varied as was the use or nonuse of the nickel carbonyl generator.

Table III sets forth the operating conditions and the results of the test runs. Metal carbonyl concentrations were measured using the same analyzer as in Example 1.

It is noted that in Examples 13–15 only, the nickel carbonyl concentration increased. This phenomenon might be due to the generation of nickel carbonyls in the vessel through contact between the synthesis gas and the nickel containing alloy forming the metal surface of the vessel. It is more likely that nickel carbonyl also is generated from a reaction between the synthesis gas and nickel metal absorbed on the zinc sulfide-zinc oxide absorbent bed surface and on the vessel surface during previous tests.

EXAMPLES 19–25

The entire process of Example 1 was repeated except that a bed of fresh zinc oxide absorbent containing 1000 grams (875 cm$^3$) of United Catalysts, Inc. type C7-2-01 zinc oxide, in the form of 3/16 inch pellets was employed. In each of the runs of Examples 19–25, a nickel tetracarbonyl (Ni(CO)$_4$) and iron pentacarbonyl (Fe(CO)$_5$) contaminated synthesis gas was fed through the absorbent bed at a rate of 200 liters per hour resulting in a space velocity of 228 hr$^{-1}$. The bed was maintained under a pressure of 900 psig. Carbon monoxide partial pressure ranged from 443 to 503 psig (30 to 34.2 atmospheres). The synthesis gas employed in Example 19 was essentially free from all sulfur contaminants, while the synthesis gas used in Examples 20-25 was also contaminated with about 0.22 volume percent hydrogen sulfide. Examples 19-25 were carried out sequentially, each successive example using the absorbent bed produced by the previous example without further supplementation or replacement of absorbent.

Table IV sets forth the operating conditions and the results of Examples 19-25. The amount of sulfur loaded on the absorbent bed was calculated from the sulfur concentrations in the inlet synthesis gas and outlet synthesis gas product.

TABLE IV

| Example No. | Nickel Carbonyl Generator | ZnS—ZnO Bed Temp. °C. | Synthesis Gas Feed | | | | | |
|---|---|---|---|---|---|---|---|---|
| | | | $H_2$ % | CO % | $Ni(CO)_4$ PPBV | $Fe(CO)_5$ PPBV | $H_2S$ % | COS PPMV |
| 19 | Bypassed | 180 | 41.3 | 55.9 | 424 | 38 | — | 0.22 |
| 20 | Bypassed | 180 | 47.3 | 51.8 | 505 | 8665 | 0.22 | — |
| 21 | Bypassed | 180 | 49.9 | 49.3 | 518 | 11083 | 0.22 | — |
| 22 | Bypassed | 180 | — | — | 627 | 13710 | 0.22 | — |
| 23 | Bypassed | 180 | 48.3 | 51.3 | 637 | 14268 | 0.22 | — |
| 24 | Bypassed | 240 | 47.9 | 52.0 | 1415 | 21050 | 0.22 | — |
| 25 | Bypassed | 240 | 49.1 | 50.8 | 1130 | 21230 | 0.23 | — |

| Example No. | Resultant Purified Synthesis Gas Product | | | | | | ZnS—ZnO Bed S Load wgt. % |
|---|---|---|---|---|---|---|---|
| | $Ni(CO)_4$ PPBV | $Fe(CO)_5$ PPBV | $H_2S$ PPMV | COS PPMV | % $Ni(CO)_4$ Removal | % $Fe(CO)_5$ Removal | |
| 19 | 778 | 38 | ND | ND | — | — | 0.0 |
| 20 | 730 | 392 | ND | ND | — | 95 | 0.6 |
| 21 | 520 | 1966 | ND | ND | — | 82 | 1.1 |
| 22 | 472 | 2958 | ND | ND | 25 | 78 | 1.6 |
| 23 | 438 | 4525 | ND | ND | 31 | 68 | 2.1 |
| 24 | 283 | 3828 | ND | ND | 80 | 82 | 2.6 |
| 25 | 363 | 3480 | ND | ND | 68 | 84 | 3.1 |

PPBV—Parts per billion by volume
PPMV—Parts per million by volume
ND—None detected, concentration below analyzer detection limit
% metal carbonyl removal = [(inlet gas concentration - outlet gas concentration)/inlet gas concentration][100%]

Example 19 illustrates that, in the absence of absorbed sulfur, zinc oxide does not remove metal carbonyls. In Examples 20-25, sulfur-containing synthesis gas fed through the absorbent bed formed a zinc sulfide-zinc oxide absorbent bed of increasing sulfur content and illustrate the simultaneous removal of both metal carbonyl and sulfur contaminants from the synthesis gas.

What is claimed is:

1. A process for removing nickel tetracarbonyl and/or iron pentacarbonyl contaminates from a gaseous stream, wherein the gaseous stream contains 108 ppbv nickel tetracarbonyl or greater and/or 23 ppbv iron pentacarbonyl or greater, which process comprises contacting said gaeous stream with a zinc sulfide absorbent to thereby remove nickel tetracarbonyl and/or iron pentacarbonyl contaminates from the gaseous stream, and separating said gaseous stream from said zinc sulfide absorbant.

2. The process of claim 1 wherein the gaseous stream comprises synthesis gas.

3. The process of claim 1 wherein the zinc sulfide absorbent comprises zinc sulfide-zinc oxide.

4. The process of claim 1 wherein the gaseous stream is contacted with the zinc sulfide absorbent at a temperature from about 90° C. to 350° C.

5. The process of claim 1 wherein the gaseous stream is contacted with said zinc sulfide absorbent at space velocities from about 200 to 5000 $hr^{-1}$.

6. The process of claim 1 wherein the gaseous stream has a carbon monoxide partial pressure ranging from about 1 atmosphere to 300 atmospheres.

7. The process of claim 1 wherein the zinc sulfide absorbent is particulate zinc sulfide per se.

8. The process of claim 1 wherein the gaseous stream also contains sulfur contaminants which are simultaneously removed along with the removal of said metal carbonyl contaminants and wherein the zinc sulfide absorbent comprises zinc sulfide-zinc oxide.

9. The process of claim 8 wherein the sulfur contaminants content of the gaseous stream is less than about 5 percent by volume.

10. The process of claim 9 wherein the sulfur contaminants are comprised of hydrogen sulfide and wherein the gaseous stream comprises synthesis gas.

11. A process for removing metal carbonyl contaminates from a gaseous stream containing such contaminates and which is free from sulfur contaminates, which process comprises contacting said gaseous stream with a zinc sulfide absorbent to thereby remove metal carbonyl contaminates from the gaseous stream, and separating said gaeous stream rom said zinc sulfide absorbent.

12. The process of claim 11 wherein the zinc sulfide absorbent is a spent zinc sulfide-zinc oxide absorbent.

* * * * *